April 27, 1965 F. G. BUHRENDORF ETAL 3,180,549
MAGNETIC TAPE FEED CONTROL APPARATUS
Filed June 19, 1958
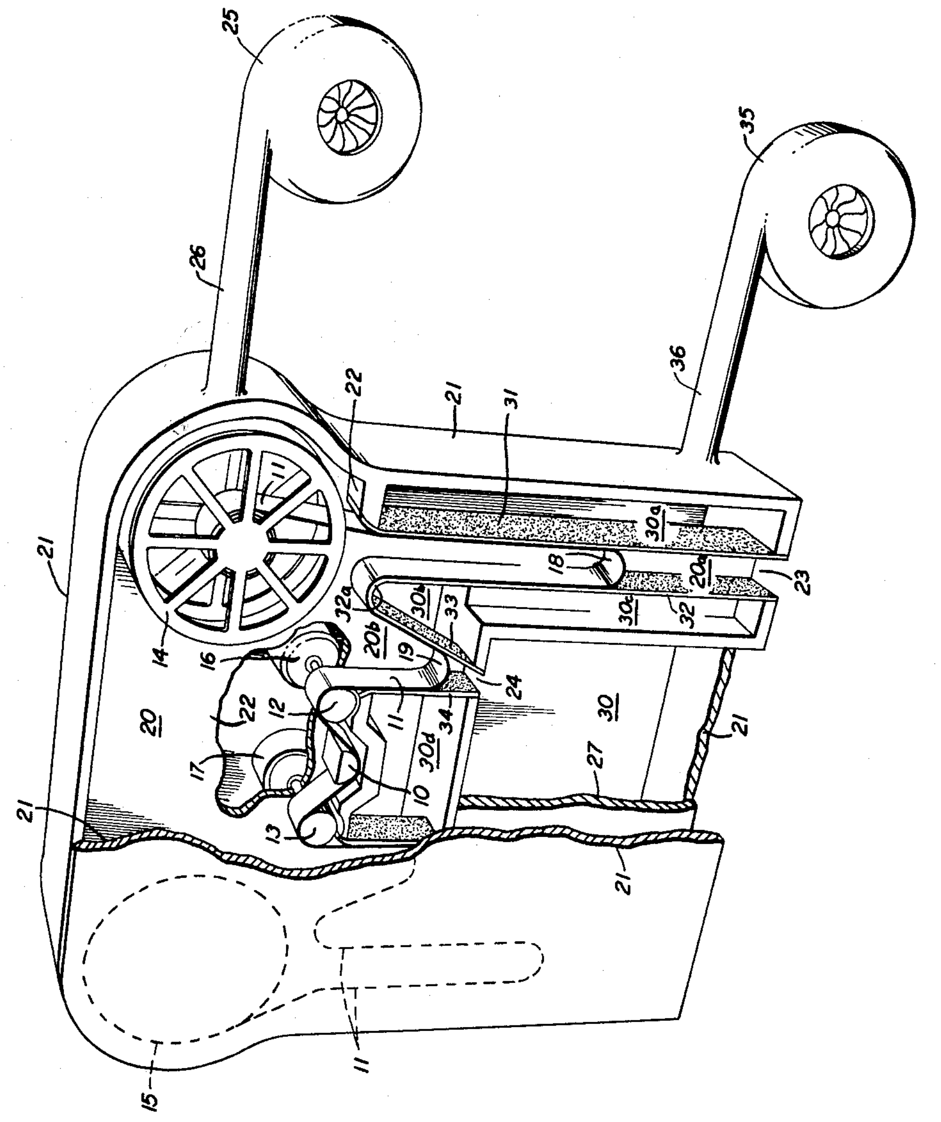
INVENTORS F. G. BUHRENDORF
L. H. MAMMEL
BY
William H. Kamstra
ATTORNEY United States Patent Office 3,180,549
Patented Apr. 27, 1965

3,180,549

MAGNETIC TAPE FEED CONTROL APPARATUS

Frederick G. Buhrendorf, Westfield, and Lewis H. Mammel, Murray Hill, N.J., assignors to Bell Telephone Laboratories, Incorporated, New York, N.Y., a corporation of New York Filed June 19, 1958, Ser. No. 743,110
21 Claims. (Cl. 226—97)

This invention relates to tape feeding apparatus and more particularly to such apparatus adapted to control the feeding of magnetic tape in magnetic information storage systems.

Information storage systems of the character in which the employment of the present invention is contemplated and which utilize magnetic tape as the basic storage medium, provide for the unreeling of the tape from its drum, its passage over a magnetic head, which "reads" the information from or "writes" it on the tape, and its reeling back to storage. In such information storage systems it is generally important that a high degree of consistency be maintained in the character of recording and playback. Thus, the physical conditions obtaining between the tape medium and the head must not only be consistent between consecutive recording operations but also between the recording operations and the playback operations. Furthermore, it is frequently necessary that the tape be started and stopped in extremely short intervals of time. These demands obviously place a considerable burden on the drive mechanisms which must reliably accomplish these operations.

The tape, for example, must be maintained under a substantially constant and unvarying tension if either of the two above requirements are to be achieved. Known means of maintaining such a uniform tension such as rollers or idlers having direct contact with the moving tape have been employed in the past. Such means however are obviously impractical in view of the high-speed start-stop requirement. Rollers or idlers moving with the tape merely add to the total mass which must be accelerated and decelerated. Means depending upon friction also have been employed in the past to maintain uniformity of tension but such means also obviously work counter to the realization of acceptable start-stop speeds. Further, friction methods have not always been able to maintain the required uniformity and also have the important disadvantage of introducing wear in the tape medium. This latter disadvantage could effectively prevent the achievement of the required degree of consistency between the recording and playback characteristics mentioned above.

Another means for maintaining a constant tension on a moving tape is the well-known method of forming a loop in the tape, which loop is then subjected to a constant air pressure. Such methods utilizing air pressure have been found useful in maintaining tension in tapes other than magnetic tapes and in systems in which operating speeds and limits are far less critical than those encountered in magnetic tape information handling systems. Thus, the applied air pressure acts equally over the entire inner surface of the tape loop thereby forcing the tape into frictional contact with the walls of the chamber in which the loop is formed. The friction so presented is proportional to the air pressure and at air pressures which are effective to maintain the necessary tension, the forces required to overcome this friction become prohibitive in magnetic tape systems where extremely high start-stop speeds are commonplace.

Another problem that is frequently encountered in connection with extremely high start-stop speeds of magnetic tapes and one which accentuates the friction problem mentioned above is the disparity in response times between the driving capstan and the storage reels. The mass of the capstan is relatively much smaller than that of the storage reels weighted possibly with virtually the entire length of the tape. In order to accommodate this disparity the tape is normally permitted to loop between the capstan and reel, the loop thus serving as a buffer which varies in length as the speeds of the two elements are matched. However, since the start time of the tape is a function of the length of the tape to be accelerated by the capstan, it will obviously be advantageous to maintain the length of the tape immediately acted upon by the capstan as short as possible.

Accordingly, it is a general object of this invention to provide a new and novel means for controlling the feed of magnetic tape during its passage over the read-record head in magnetic tape information storage apparatus.

Another object of this invention is to make possible a higher degree of uniformity in the tensioning of magnetic tapes during passage over magnetic read-record heads in tape feed control apparatus.

Still another object of this invention is to increase the acceleration and deceleration of magnetic tape during start-stop operation in tape feed control apparatus.

More specifically and in furtherance of the foregoing objects, it is an object of this invention to substantially eliminate friction in connection with loop-forming arrangements in tape feed control apparatus.

It is also specifically an object of this invention to reduce the length of tape and thereby its mass, which must be moved by a driving capstan in start-stop operation of tape feed control apparatus.

A further object of this invention is to provide an improved tape loop forming apparatus by means of air pressure in tape feed control systems.

The foregoing and other objects are realized in one illustrative embodiment of this invention in which the tape drawn from the storage reel is permitted to loop in a chute of a first chamber, which chute opens to the air at ordinary pressures. Air is then introduced into the first chamber at a constant higher pressure which, acting upon the tape loop inside the chute serves to maintain the tape under a constant tension. According to one feature of this invention the friction between the walls of the chute and the tape is eliminated by interposing a layer of air at a still slightly higher pressure between the outer surface of the tape loop and the walls of the chute. A sealed, second chamber surrounding the chute is provided in which the air at the slightly higher pressure is introduced. This air is permitted to escape through capillaries provided in the walls of the chute separating the two chambers and, as a result, the tape loop is maintained out of contact with the walls of the chute.

It is another feature of this invention that the dimensions of the capillaries are such as to prevent an undue loss of air resulting from variations in the extent of the tape loop. Advantageously, any air permeable material having a high resistance to air flow may serve to provide the requisite air layer. Since only a very small flow of air is permitted or required to maintain the constant tension, a relatively low power is required to maintain the air under pressure.

Since the tape loop serves as a buffer between the fast starts and stops of the capstan and the relatively slow response of the storage reel, the tape loop varies in length between limits which may be intolerable in view of the variation in mass presented as a result. Accordingly, another feature of this invention is a second chute which is provided in the first chamber adjacent the first chute in which the tape is also permitted to form in a second, shorter loop before proceeding to the driving capstan. The pressure of the air in the first chamber also acts upon this loop to maintain the tape under a constant tension. The walls of the second chute are tapered outwardly such that the shorter the length of tape which is permitted to loop, the larger will be the radius of the loop upon which the air pressure in the first chamber acts. As the capstan accelerates, the tape in the second chute will be momentarily shortened and a larger force will be exerted against the tape. As a result, tape will be drawn from the first chute until the forces on the tapes in both chutes are equalized. The tape loop in the first chute thus varies in length as the tape reel responds to the starts and stops of the capstan while the length of tape to be accelerated by the capstan tends to remain constant and minimal in the second chute. An air layer is also provided as a lubricant between the surface of the tape loop and the walls of the second chute in accordance with the feature of this invention mentioned hereinbefore.

The new and novel manner of putting to use the difference in the pressure of air in one chamber as applied to one surface of tape loops in that chamber and the pressure of air in another chamber as applied to the other surface of those tape loops thus achieves the closely related objectives of uniform tape tensioning and frictionless tape travel. The realization of both of the latter objectives is advantageously exploited to realize the further goal of attaining maximum start-stop speeds by making possible the reduction of the mass of the tape moved to an absolute minimum. The air pressure in the one chamber in co-operation with the tensioning and lubrication operations thus achieves a third objective in this invention of reducing the tape length directly moved by the driving capstan.

The foregoing and other objects and features of this invention will be better understood from a consideration of the detailed description of an illustrative embodiment thereof which follows. The single figure of the drawing is a perspective view of the illustrative embodiment, portions of which are broken away to more clearly show the relationship of the air pressure chambers and tape looping chutes.

An illustrative magnetic tape feed control apparatus in connection with which the principles of this invention may conveniently be described is shown in the drawing. In such an arrangement the passage of the tape over a magnetic read-record head 10 is controlled on either side by a pair of capstans 12 and 13 which move the tape 11 as it is unreeled from the storage reels 14 or 15. The tape 11 may thus be driven in either direction during the reading or writing operations. The capstans 12 and 13 are rotated by motor means 16 and 17, respectively, and the storage reels 14 and 15 normally are also driven by motor means under the control of external control circuit means not shown. The means for driving and controlling the rotation of the capstans and storage reels are outside the scope of this invention and accordingly need not be described in detail herein. The illustrative dual arrangement shown in the drawing is substantially symmetrical on either side of the head 10 for reasons which will appear hereinafter; accordingly, only the details of the organization of the side shown in the foreground of the drawing will be described in detail.

The tape 11 is suspended between the storage reels and capstans in loops. Thus the tape 11 is formed into the loops 18 and 19 between the storage reel 14 and capstan 12 in a looping chamber 20 also enclosing the tape loops on the opposite side of the head 10. The chamber 20 is formed in part by the sides of an enclosure 21, shown partially broken away, encasing the storage reels 14 and 15 and drive control apparatus, and in part by an inner enclosure 22 also partially broken away to show the disposition of the capstan motors 16 and 17. A pair of chutes **20*a* and 20*b* are provided in the chamber 20 which chutes enclose the loops 18 and 19, respectively. The chutes 20*a* and 20*b* are open at one end to atmospheric pressure through the openings 23 and 24, respectively. As is apparent in the drawing, the chutes 20*a* and 20*b* provide convenient retaining enclosures within which the tape loops may be raised or lowered as the length of the tape between the storage reel 14 and capstan 12** varies during the tape feed operation.

The tape 11 is maintained under a constant tension on both sides of the head 10 by air pressure acting upon the tape loops, such as the loops 18 and 19, in the chutes **20*a* and 20*b*. The enclosing walls of the chamber 20 are sealed to prevent air leaks and air at a constant pressure is introduced into the chamber 20 by the blower means 25 via a duct 26. The tape loops 18 and 19 and similar loops on the opposite side are directly suspended in the only air escape openings, with the result that a force is exerted on the loops, such as the loops 18 and 19, equal to the product of the pressure and the effective area of the loop surfaces extending into the chutes. The entire length of the tape 11 is thus maintained under tension. Because of the substantially symmetrical arrangement, the tape on either side of the head 10 will be in tensile balance. As a result, the driving capstans 12 and 13 have only to move the mass of the tape and no energy is expended in overcoming imbalances of tension when the tape is drawn from one side to the other past the head 10**.

Each of the chutes in which the tape 11 is looped projects into a second chamber 30 which is formed in part by the sides of the enclosure 21, shown partially broken away, the inner wall 22 of the chamber 20, and a second inner wall 27. The walls of the chamber 30 are so arranged that in this embodiment it has in common with the chamber 20 at least three walls of each of the chutes enclosing the tape loops. Thus, for example, the subchambers **30*a*, 30*b*, 30*c*, and 30*d* are formed in order to realize the common walls 31, 32, 33, and 34, respectively, of the chutes 20*a* and 20*b*. The chamber 30 is maintained under a constant but greater air pressure than that in the chamber 20 by a blower means 35 which introduces air into the chamber 30 via a duct 36. No direct openings to atmospheric or lower air pressures are provided in the chamber 30. Two walls of each of the chutes, however, have capillary perforations therein to permit a controlled escape of air from the chamber 30 to the chutes of chamber 20 due to the pressure differential maintained by the blower means 25 and 35. Referring to the right side of the symmetrical arrangement of the drawing, the walls 31 and 32 of the chute 20*a* and the walls 33 and 34 of the chute 20*b* together with the wall portion 32*a* connecting the walls 32 and 33 are shown to be so perforated. Each of the chute walls so perforated, forming on one side a face of the chamber 30, faces on the other side an outer surface of one of the tape loops such that any air which is permitted to escape through the capillary perforations is directed against an outer surface of the loop of tape wherever such surface can come into contact with the walls. The peforations of the chute walls may conveniently comprise capillary tubes which are fitted in holes provided therefor in the walls. Since the capillary perforations serve only as high impedances to the passage of air, any air permeable material having such a high impedance may advantageously be used. Thus, for example, each portion of the chute walls facing an outer tape loop surface may constitute a high density felt strip or such a felt strip may be affixed to the drilled walls instead of fitting the capillary tubes in the holes. By means of the air pressure applied through the air permeable walls of the chute, tape friction resulting from contact with the looping chute walls as a result of the applied tensioning pressure in chamber 20 is thus eliminated. By regulating the relative air pressures in the chambers the tape loops are in fact balanced between the pressure in one chamber and the escaping air from the other. Since the air permeable means, such as the capillary tubes of high density felt mentioned above, permit only a limited passage of air, no undue loss of pressure in the chamber 30** can occur on occasions when the inner sides of the chute walls are uncovered due to the tape loop being momentarily drawn up into the chute. In one embodiment in which capillary tubes were employed, it was found that such tubes one inch long spaced one half inch apart with an inside diameter of .012 inch satisfactorily controlled the escape of air and eliminated all friction.

Either of the tape loops 18 or 19 may be drawn up into its chute when the drive speed of the capstan 12 and the take-up or unreeling speed of the storage reel 14 is not precisely matched. Since a disparity between the masses of the capstans and storage reels exists which may vary widely depending upon the amount of tape on the reel at any given instant, the response of the storage reel to the extremely high-speed starts and stops of the capstan is relatively slow and variable. Accordingly, such a match between capstan and storage reel speeds is difficult to maintain. The tape loops thus, in addition to providing a convenient means for applying tensioning air pressure, also act as a buffer to absorb the varying tape length between the capstans and storage reels. In the symmetrical arrangement of the embodiment of this invention, an equal tension is applied to the tape loops on either side of the head 10 by the air pressure in the chamber 20 as was previously described. The chamber 20 is advantageously large in comparison with each of the chutes, such as the chutes 20*a* and 20*b*, with the result that pressure fluctuations caused by the pumping action of the movement of the tape loops in the chutes is absorbed in the large chamber 20. The tension on the tape 11 may thus be maintained virtually constant over the entire length of the tape from one storage reel to another and also balanced on either side of the head 10.

The variations in the length of the tape loops resulting from the difference in response times of the capstans and storage reels, however, result in variations in mass which must be moved by the capstans in their tape driving function. To maintain the tape mass to be moved by each capstan also substantially constant and minimal the action of the air pressure on a tape loop of variable radius is utilized on either side of the head 10. The tape loop 19, for example, which is directly acted upon by the capstan 12, is shaped by the enclosing walls 33 and 34 of the chute 20*b* in a manner such that as the length of the tape suspended from the capstan 12 decreases the radius of the loop 19 increases. To accomplish this control of the radius of the tape loop 19, the walls 33 and 34 are tapered outwardly and are each of a predetermined length. The walls of other tape loop chutes on either side of the head 10, such as the walls 31 and 32, are advantageously substantially parallel so that the radius of the loop 18 remains substantially constant no matter where the loop 18 is suspended in the chute 20*a*. The forces acting upon the tape loops 18 and 19 as a result of the air pressure in chamber 20 will be substantially equal when their radii are equal and at that point the loops 18 and 19 will balance each other. When, for example, as a result of the acceleration of the capstan 12, a momentary additional tension is exerted on the tape of the loop 19 the latter loop will be drawn up into the chute 20*b* and the radius of the loop 19 will increase. The force acting on the loop 19 correspondingly increases and additional tape will be drawn from chute 20*a* into chute 20*b* until the forces on the two loops 18 and 19 are again in balance. Assuming the additional tension applied to the tape by the accelerating capstan to be instantaneously applied, the values of the applied air pressure in the chamber 20, and the lengths and degree of taper of the walls 33 and 34 may be so chosen that the length of the tape loop in chute 20*b* is maintained substantially constant and minimal. A column of air is thus advantageously employed to act directly as a servo in controlling the length of a loop of tape.

While the arrangement which has been described has been found advantageous for the control of the feeding of magnetic tape in information handling systems, the application of the principles of this invention is not so limited. Thus, with only slight modification within the ability of one skilled in the art the feed control principles of the invention described above may be applied to other tape or strip feed control apparatus where the features of this invention can be advantageously employed. It is obvious from the detailed description provided above that this invention may also be practiced in arrangements in which gases other than air are employed to provide the necessary pressures. Further, since its operation is not dependent upon the compressibility of the pressure medium, any fluid may be used to control the tape feed according to the principles of this invention and the scope of this invention is to be understood as also encompassing arrangements in which liquids are so used as dictated by specific applications.

Thus, what has been described is considered to be only one illustrative embodiment of this invention and numerous other arrangements may be devised by one skilled in the art without departing from its spirit and scope.

What is claimed is:

1. In a tape handling apparatus, a chamber having air permeable walls facing a first surface of a loop of said tape, means for tensioning said tape comprising means for maintaining a first air pressure against the other surface of said tape greater than a second air pressure on said first surface, and means for applying air streams against said first surface of said tape through said air permeable walls to maintain said first surface away from said walls comprising means for maintaining a third air pressure in said chamber higher than said first and second air pressures.

2. In a tape handling apparatus, a first chamber enclosing a loop of said tape, means for maintaining a first air pressure in said first chamber against one surface of said loop, said first air pressure being sufficient to hold said loop under tension against a second air pressure acting against the other surface of said loop, a second chamber, means for maintaining a third air pressure in said second chamber higher than said first and second air pressures, and air permeable walls between said first and said second chambers for permitting air streams from said second chamber to be applied against said other surface of said loop.

3. The combination with a tape handling apparatus including a storage reel and driving capstan, means for movably suspending said tape in a plurality of loops between said storage reel and said driving capstan, a first chamber enclosing said loops of said tape, means for maintaining a predetermined first air pressure in said first chamber on the inner surface of said tape loops against a second lower air pressure acting on the outer surface of said tape loop in said first chamber, a second chamber, air permeable walls separating said first and second chambers facing said outer surface of said tape loops, and means for applying air streams through said air permeable walls against said outer surface of said tape loops comprising means for maintaining a predetermined third air pressure in said second chamber higher than said first and second air pressures.

4. The combination as claimed in claim 3 in which said air permeable walls facing the outer surface of at least one of the said tape loops are substantially parallel and the air permeable walls facing the outer surface of at least another of said loops are tapered.

5. The combination with a tape handling apparatus including a storage reel and driving capstan, means for suspending said tape in a plurality of loops between said storage reel and said driving capstan, a first chamber for enclosing said loops of said tape, means for maintaining a first fluid pressure in said first chamber on one surface of said tape loops against a second lower fluid pressure acting on the other surface of said tape loops in said first chamber, a second chamber having walls common to said first chamber, means for maintaining a third fluid pressure in said second chamber higher than said first and second fluid pressures, and means in said walls for permitting the application of fluid streams against said other surface of said tape loops.

6. The combination as claimed in claim 5 in which said first and said second fluid pressures are gaseous.

7. The combination as claimed in claim 5 in which each of said fluid pressures is gaseous and in which said last-mentioned means comprises gas permeable portions of said walls facing said other surface of said tape loops.

8. The combination as claimed in claim 5, in which two of said walls face at least one of said loops and are substantially parallel and two other of said walls face at least another of said loops and are tapered.

9. The combination as claimed in claim 8, in which said tapered walls face a loop of said tape adjacent said driving capstan.

10. A tape feed control comprising, in combination, a storage reel, a driving capstan, a first chamber for looping said tape in at least one loop between said storage reel and said driving capstan, a second chamber having walls common to said first chamber, at least two of said walls facing said loop, means for maintaining a first fluid pressure on one surface of said tape loop in said first chamber against a second lower fluid pressure acting on the other surface of said tape loop in said first chamber, means for maintaining a third fluid pressure in said second chamber, and fluid permeable means in each of said two walls for permitting the application of fluid streams from said second chamber to said other surface of said tape loop in said first chamber.

11. A tape feed control comprising, in combination, a storage reel, a driving capstan, a first chamber having a first and a second chute for looping said tape in a first and a second loop, respectively, between said storage reel and said driving capstan, a second chamber having walls common to each of said first and second chutes, means for maintaining a first fluid pressure on one surface of each of said loops in said first chamber against a second lower fluid pressure acting on the other surface of said tape loops in said first chamber, and means for maintaining the other surface of each of said loops out of contact with the walls of said chutes comprising means for maintaining a third fluid pressure in said second chamber higher than said first and second pressures and fluid permeable means in the walls of each of said chutes for permitting the application of fluid streams from said second chamber to said other surface of each of said loops.

12. A tape feed control as claimed in claim 11 in which the walls of said first chute are substantially parallel and the walls of said second chute have a predetermined taper and length, said second chute being disposed such that a tension is applied to said second tape loop directly by said driving capstan.

13. A tape feed control as claimed in claim 12 in which said taper and length of the walls of said second chute are determined such that said first fluid pressure on said first and second tape loops maintains the length of said second tape loop substantially constant regardless of variations in said tension.

14. A tape feed control as claimed in claim 13 in which said fluid permeable means comprises sections of said walls having a plurality of capillaries therein facing said other surface of each of said loops.

15. Control apparatus for feeding magnetic tape from a storage reel comprising, in combination, means for maintaining a uniform tension on said tape comprising a first chamber enclosing loops of said tape and means for maintaining a first gaseous pressure on the inner side of said tape loops with respect to a second lower gaseous pressure on the outer side of said tape loops in said first chamber; a capstan for directly driving one loop of said tape; means for maintaining said one loop at a minimum length comprising means for shaping said one loop such that said length varies inversely with the gaseous pressure exerted on said inner surface of said one loop; and means for eliminating tape friction comprising a second chamber having walls common to said first chamber, said walls facing said outer surface of each of said loops, means for maintaining a third gaseous pressure in said second chamber higher than said first and second pressures, and gas permeable means in said walls for permitting the application of gaseous streams through said walls against said outer surface of said loops.

16. Control apparatus as claimed in claim 15 in which said means for shaping said one loop comprises paritcular walls of said second chamber facing said outer surface of said one loop having a predetermined length and a taper such that as said length of said one loop decreases the radius of said one loop increases.

17. Control apparatus for feeding magnetic tape from a storage reel comprising, in combination, a first chamber for looping said tape in at least a first and a second loop, means for applying air under a first pressure to the inner surface of said loops against air acting on the outer side of said loops under a second lower pressure to tension said tape, a capstan for applying accelerating and decelerating tensions to said first loop, and means for maintaining the length of said first loop constant comprising first shaping means for shaping said first loop to vary the radius of said first loop inversely with the length of said first loop and second shaping means for shaping said second loop to maintain the radius of said second loop constant.

18. Control apparatus as claimed in claim 17 in which said first shaping means comprises walls having a predetermined length and taper facing said first loop and in which said second shaping means comprises walls substantially parallel facing said second loop.

19. Control apparatus as claimed in claim 18 also comprising a second chamber including said walls of said first and second shaping means, means for maintaining air under a third pressure higher than said first and second pressure in said second chamber, and air permeable means in said walls for permitting the application of air streams through said walls to the outer surface of said loops.

20. In a tape handling device, the combination of, means for passing tape across a reproducing head, at least one chamber on each side of said head into which said tape is looped, means for producing a pressure differential on opposite surfaces of said tape while it is looped in said chambers and a plurality of openings in said chambers along the tape path for admitting air to form an air cushion between said tape and said chamber along said tape path.

21. In a tape handling apparatus, a chamber having a wall portion, a tape movably arranged within said chamber facing said portion, means producing a pressure differential within said chamber on opposite surfaces of said tape, and a plurality of openings in said wall portion for admitting air between said tape and said portion.

References Cited by the Examiner

UNITED STATES PATENTS

| | | | |
|---|---|---|---|
| 1,161,346 | 11/15 | Schmidt | 271—2.1 |
| 2,064,793 | 12/36 | Griggs | 271—2.6 |
| 2,612,566 | 9/52 | Anderson et al. | 179—100.2 |
| 2,678,173 | 5/54 | Phelps | 346—136 |
| 2,778,634 | 1/57 | Gams et al. | 271—2.3 |

FOREIGN PATENTS

| | | |
|---|---|---|
| 1,163,105 | 9/58 | France. |

ROBERT B. REEVES, *Acting Primary Examiner.*

RICHARD A. WAHL, WILLIAM F. PURDY, JOSEPH P. STRIZAK, JOHN C. CHRISTIE, *Examiners.*